Dec. 15, 1942.  R. H. BOLE  2,305,567
LANDSCAPE DESIGNING DEVICE
Filed Oct. 18, 1940

INVENTOR.
ROBERTA H. BOLE
BY John H. Leonard,
her attorney.

Patented Dec. 15, 1942

2,305,567

UNITED STATES PATENT OFFICE 2,305,567

LANDSCAPE DESIGNING DEVICE

Roberta H. Bole, Bratenahl, Ohio

Application October 18, 1940, Serial No. 361,712

10 Claims. (Cl. 35—20)

This invention relates to a device for designing gardens, landscapes, and the like.

One of the principal objects of the present invention is to provide a device employing pictorial cut-outs and by which accurately scaled pictorial representations of gardens and landscapes can be composed efficiently, and by which the proper plants to use and the proper location of the plants in the actual garden or landscape for reproducing the composition or design in actuality can be determined easily.

Another object is to provide a series of cut-out color pictures which are all to the same scale, each picture being that of an individual plant and being adapted to be supported in upright position in desired relation to other pictures of the series.

A correlative object is to provide, for use with the series of cut-out pictures, a scaled base or ground plot which represents an area to be planted and is adapted to accommodate and hold the cut-out pictures of the plants in the selected assembled relations, and which has locating indicia and other means thereon spaced certain scaled distances apart based on the same scale as the cut-out pictures.

A more specific object is to provide pictures of the general character described which are mounted on cut-outs of cardboard or other self supporting material, the material being cut out so closely to the true outline of the plants pictured thereon that, when the cut-outs are assembled in the desired relation to each other to form a garden design, each cut-out conceals approximately the same portions of the pictured plants in the rear thereof as a corresponding forwardly disposed plant would conceal of a rearwardly disposed plant if actual plants corresponding to the pictures were planted in the garden in the same relation to each other as the pictures in the resulting composition or design.

Another object is to provide, for these purposes, cut-outs of which one face bears a picture of a plant at the blooming period, or some predetermined season, and of which the opposite face bears a picture of the same plant at another period or season, whereby a garden may be designed more efficiently because, by reversing the faces of the cut-outs in a composition, the appearance of the garden at different seasons can be determined more readily and the particular type of plant to be used to produce the desired effect at a given season without causing gaps and unsightly portions in the garden at other seasons can be selected and located in proper relation to other plants.

A more specific object is to provide scaled cut-out plant pictures, each of which has a base adapted to be engaged in the supporting means of the base plot, the cut-out base being so related in size and scale to the associated pictured plant as to constrain the operator or designer to place the pictured plants at least as far from other pictured plants in a given row as a scaled distance corresponding to the preferred minimum distance at which the actual plant should be spaced from others in the garden.

Other objects and advantages will become apparent from the following specification wherein reference is made to the drawing in which:

Fig. 1 is a plan view of an assembly of a base plot and cut-out pictures of plants illustrating a preferred embodiment of the present invention.

Figs. 2 and 3 are sectional views taken on planes indicated by the lines 2—2 and 3—3, respectively, in Fig. 1.

Figure 1:
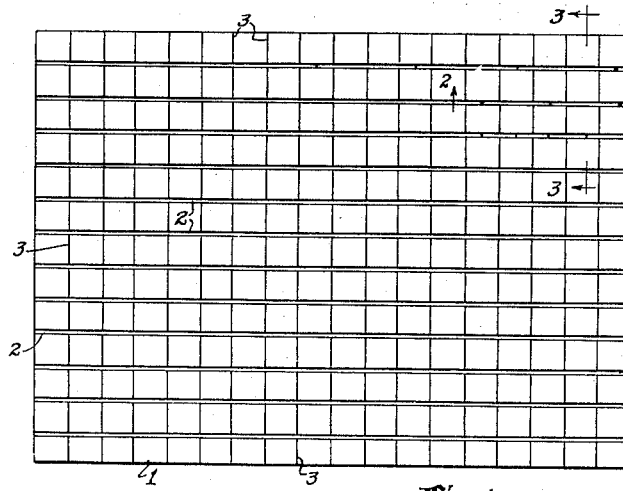
Figure 2:
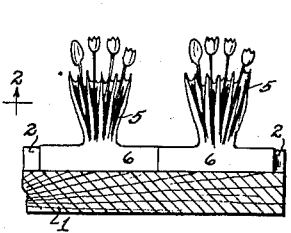
Figure 3:
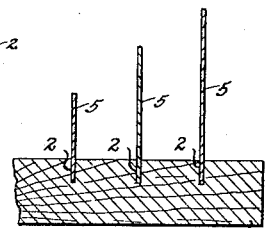

Referring to the drawing, the base plot 1 may comprise a piece of wood, synthetic composition, or suitable rigid material, the upper surface of which is preferably the color of earth. The plot 1 has attaching means for pictorial cut-outs to be used in connection therewith. In the form illustrated, the attaching means comprise a plurality of slots 2 which preferably extend from end to end of the plot 1 parallel to the front edge thereof. The slots 2 are placed a predetermined scaled distance apart from each other. For example, in the illustrative example, the slots are located one-half inch apart, based on a scale of one inch to the foot. On the top surface of the block 1 and extending parallel to each other and at right angles to the slots 2 are parallel lines 3, these lines preferably being spaced apart the same distances as the slots 2 so as to provide a convenient system of rectangular coordinates.

If desired, slots can be substituted for the lines 3 so that a rectangular block can be used to advantage for designing relatively deep narrow gardens or relatively wide shallow gardens.

Figure 4:
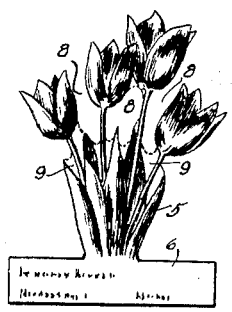
Fig. 4 is a front elevation of a typical cut-out used in the present invention.
Figure 5:
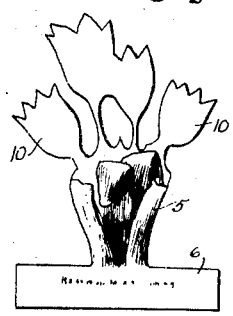
Fig. 5 is a rear elevation of the cut-out illustrated in Fig. 4.

Referring next to Figs. 4 and 5, there is illustrated a typical pictorial cut-out 5 which comprises a principal part of the present device. Each cut-out 5 may be made of cardboard, wood, or any relatively thin but self-supporting and non-warping material. The cut-out 5 has a base 6 adapted to be received in the slots 2, the base in the form illustrated being integral with the remainder. On one face of each cut-out is a true and accurate color picture of a plant, a picture of a tulip in bloom being shown for purposes of illustration. The picture is the same scale as that used for the base plot 1, one inch to the foot being preferred because such a scale is sufficiently large to include enough detail of the plant and yet sufficiently small to provide a convenient size for designing work. The greater portion of the material around the pictured plant and blooms and between the various portions thereof is cut away, as indicated at 8. Due to accurate cut-out work, as near a true outline of the blooming plant as possible is provided. Consequently, a forwardly disposed cut-out conceals the same portions of a rearwardly disposed cut-out as a forwardly disposed plant would conceal of a rearwardly disposed plant if the actual plants corresponding to the cut-outs were located in the garden at the relative locations indicated by the design. Small unprinted areas, as indicated at 9, necessarily cannot be removed in all instances without rendering the cut-out too weak at certain portions, but the unprinted and un-cut areas 9 are reduced to the minimum possible for the particular pictured plant.

On the reverse face of each cut-out, as illustrated in Fig. 4, is a picture of the same plant as on the opposite face but picturing the plant at a period different from the blooming period, or whatever period may be represented on the opposite face. Thus, in Fig. 5, the tulip is shown on the reverse face as it appears after the blooming period, in which case the size of the leaves has somewhat increased, the ends have turned downwardly, and the blooms and their stalks have fallen over or have been removed. If desired, of course, the plant at seasons other than those described can be pictured on the opposite faces, respectively, depending upon the particular problem of the designer.

On the face opposite from the picture of the plant in bloom, the portion of the cut-out extending above and beyond the limits of the plant as it appears at the different season is unprinted, as indicated at 10, or printed in a contrasting color, so that if a gap would occur in the garden because the plants did not bloom at the same period, the attention of the composer or designer would be very forcibly directed to the defect in his design, as more fully described hereinafter.

Figure 7:
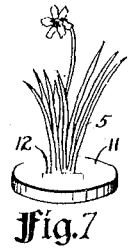
Figure 8:
Figure 6:
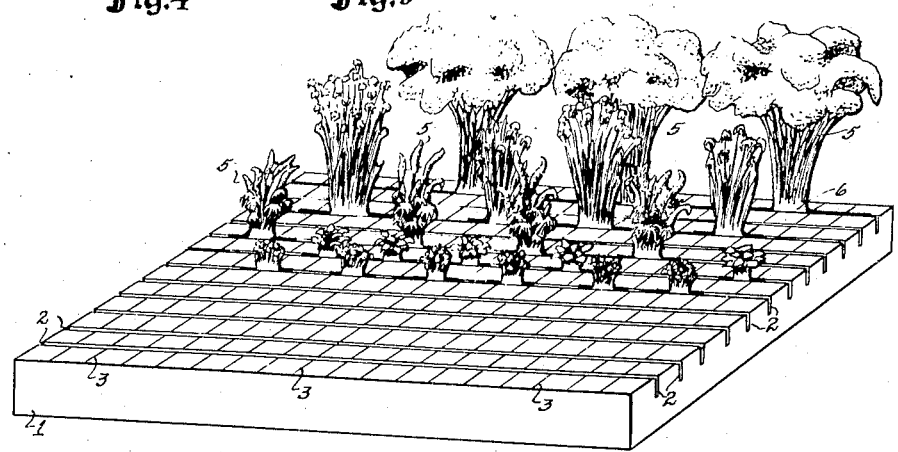
Fig. 6 is a perspective view of an assembled base plot and cut-outs and illustrates the association thereof for purposes of designing gardens and the like, and Figs. 7 and 8 illustrate modified forms of bases for the cut-outs used in the present invention.

The base 6 of each cut-out preferably is of the same depth as the grooves 2 and the same scale as the associated picture. The length of the base 6 is equal to the scaled minimum distance which that particular plant should be planted from others of the same kind for insuring healthy growth. The base 6 not only is made to scale but also extends equidistantly in opposite directions from the vertical median line of the pictured plant, so that the composer is constrained by engagement of the ends of the bases of the cut-outs to space each plant in a given row, whether of the same kind or not, at least the required minimum planting distance from other plants in the same slot or row. By rotating any plant about its vertical median line, or axis, to a position at right angles to the position which it occupies in the slot, the ends of the base 6 describe a circle bounding the area which should be left unplanted adjacent to that particular plant. If desired, circular discs 11, such as illustrated in Fig. 7, and having slots 12 for receiving and holding the lower end portion of the cut-outs may be used instead of the bases 6. Also, as illustrated in Fig. 8, wire holders formed by bending a length of wire to form an annulus 13 with its free end portions 14 normal to the plane of the annulus and adapted to receive a cut-out between the free end portions may be used. In both of these modified bases, the radii correspond in length to half the scaled minimum planting distance. Since many plants have the same planting distance, the same size of the modified bases may be used at different times with several different cut-outs. If desired, the bottom portion of the cut-out may extend slightly below the modified bases so as to engage in a slot when the base lies flat on the base plot 1.

A series of such cut-outs made to the same scale and in true colors and showing on one face the plant at one season and on another face the plant at another season can be provided for any and all plants which can be grown in a certain locality.

Usually gardens are designed with the idea of the appearance or effect to be produced by the plants when in bloom. The designing of the garden in color during the blooming period is obtained by placing the cut-outs in the slots in the base 1 in different relations to each other until the desired effect is obtained. Due to the bases 6, the plants cannot be placed too closely together along the same slot, and by very easy manipulation, proper spacing of each plant from others at right angles to the slots 2 can be determined, regardless of which slot the cut-outs may occupy. When a garden in bloom is thus designed to meet the desires of the designer, each of the plants then is reversed in its slot on the plot 1 and the appearance of the garden at a different season but from the same location of the viewer is made apparent. This may show that an undesirable gap or unsightly appearance exists in one or more portions of the garden at a particular season or period. In such case, another plant may be selected which, in the blooming period, approximates very closely the general appearance of the one which caused the gap and yet which has a proper growth at the other period for filling in the space or gap which was caused by its predecessor in the design.

In order to render the device even more effective, the different faces of the base 6 of each cut-out may be provided with informative indicia such as the duration and extent of the period during which the plant has the appearance shown on that particular face of the cut-out. Thus, when the garden design has the appearance desired, the cut-outs are lifted and the blooming periods compared. If upon checking the blooming periods, it is found that certain plants will not be in bloom at the same time as the majority, cut-outs of other plants having the same general appearance or composition effect and the same relative blooming period as the majority may be selected and substituted. If none of the latter exist, then the design must be revised accordingly.

When the key plants have been determined, other plants having the essential characteristics required usually can be found and filled in readily and the designer thus can be assured that at a given period or season, the garden will have the appearance he desires and will not have an unattractive appearance at other seasons.

In some instances it is desired to plant a garden in which certain effects are to be obtained at one season and different effects at another season. As an example, it may be desired to have a garden in which the plants which bloom in the spring are to be concealed by the later summer plants which present a different design entirely. While this can be determined to a fair degree by proper relation of the faces of the cut-outs, the unprinted portions 10 of some cut-outs, after having served their purposes of indicating a defect in the design, may conceal essential parts of other plants for the particular season and thus render further designing of the part of the garden in the rear thereof more difficult. For use in such instances, cut-outs of the same plants as they appear at seasons when they are not in bloom, or have not obtained a full growth, may be provided. These latter cut-outs can be used to replace temporarily on the base plot such of the full-bloom cut-outs as have already served their purpose. Again, a series of green blanks of different shades and sizes which are approximately the scaled sizes of the various plant in the series of cut-outs as they appear in seasons other than the blooming season or the seasons shown by the original cut-outs may be provided. Also, plain green cards of various shades and which can be cut out by the designer so as to approximate the outline of any pictured plant during the particular season in question can be used and substituted for the cut-out of which an unprinted portion is exposed. Such blank for cut-outs are preferably a graded series of simple squares or rectangles, each of which can be cut by the designer to any desired width of base, height and general shape, these features being determined by comparison with the picture portion of the particular face of the cut-out for which a blank is to be substituted. Thus, after the unprinted portions have served to indicate a defect or the like, the substitute cut-outs can be substituted therefor and the composition can be carried through in a manner such that the cut-outs to the rear of other cut-outs will not be concealed by the unprinted portions of the latter. The occupation of a certain portion of the slots by the substituted blanks precludes placing other plants in the same locations and assures allowance in the design for proper planting distances.

In addition, each base 6 is provided with informative indicia designating the plant shown on that particular cut-out and suitable number or code symbols by which the cut-out is keyed to a catalogue showing the best, or selected, varieties of the plant illustrated, or, perhaps, a substitute having the general appearance of the plant illustrated.

If desired, various backgrounds representing houses, the sky, stone walls, and the like, and printed on stiff paper so as to be accommodated in one of the slots 2 may be provided for enhancing the realistic effect of the design. Also, the top face of the base plot 1 may be coated with some granular substance such as ground cork, or sand, so as to give an appearance of loose garden earth.

The device is illustrated principally in connection with the designing of flowering garden plants and the like, but it is meant to include shrubbery, trees, and any and all plants which may be used in gardening and landscaping effects.

Having thus described my invention, I claim:

1. A designing device for the purposes described comprising cut-outs of relatively thin, rigid, self-sustaining material, each having a picture of a plant on one face, each of said cut-outs having an outline which substantially conforms to the outline of the plant pictured thereon so that when one cut-out is placed in front of another, the forwardly disposed cut-out conceals only that part of the one in the rear thereof that a corresponding forwardly disposed plant would conceal with respect to a corresponding rearwardly disposed plant if the actual plants represented by the cut-outs were placed in the relation indicated by the device, and said pictures being on the same scale, and bases on the cut-outs, said bases being abuttable with each other when the cut-outs are arranged in a given row with the pictured plants upright, and the bases and associated pictured plants being related to each other, on said scale, to position the cut-outs the scaled required minimum planting distances from each other of the plants pictured on the cut-outs, when the cut-outs are arranged in said row with the bases abutting.

2. In a designing device for the purposes described, a series of cut-outs each cut-out having on one face a picture of a plant at a predetermined period, the cut-out conforming closely in outline generally to the outline of the plant at that particular season, the opposite face of each cut-out having a picture of the same plant as the one on its other face at a different period, the pictures on opposite faces of the same cut-out being to the same scale, and the pictures on all of the cut-outs of the series being to said scale, the pictures on some of the cut-outs being pictures of different plants from the pictures of other cut-outs of the series bases on the cut-outs, said bases being abuttable with each other when the cut-outs are arranged in a given row with the pictured plants upright, and the bases and associated pictured plants being related to each other, on said scale, to position the cut-outs the scaled required minimum planting distances from each other of the plants pictured on the cut-outs, when the cut-outs are arranged in said row with the bases abutting.

3. A designing device for the purposes described and comprising a plurality of scaled, cut-out pictures, each picture being of an individual plant, and the series containing pictures of different plants, all of said pictures being on the same scale, means on each cut-out for supporting the cut-out in upright position in desired selected positions with respect to other cut-outs, said means being abuttable with respect to each other and being of a size to represent to said scale the preferred planting area to be allowed for the plant represented by the associated cut-out, whereby when the plants are placed in a row they are prevented from being placed closer together than the scaled planting distance.

4. A designing device for the purposes described and comprising a plurality of cut-out pictures, each picture being of an individual plant, and the series containing pictures of different plants all of said pictures being on the same scale, bases on the cut-outs, respectively, a plot for supporting the pictures, said plot having a plurality of slots located scaled distances apart to the same scale as the pictures and adapted to receive the said bases and thereby support the cut-outs in selected positions, each of said bases extending substantially equidistantly in opposite directions from the vertical median line of the associated pictured plant, and the length of said base being substantially equal to the corresponding dimension, on said scale, of a preferred planting area of the pictured plant in actual planting.

5. A designing device for the purposes described and comprising a plurality of cut-outs, each cut-out being relatively rigid, self-sustaining flat material, a picture on one face of the cut-out, said picture being to scale and picturing a plant at a predetermined period during which it is relatively large in proportion to its size at a different predetermined period, a picture on the other face of the plant at said different period, said picture being to the same scale, said cut-out conforming in outline substantially to the outline of the picture which represents the plant at said first-mentioned period, and said other face of the cut-out beyond the picture of the plant thereon being of contrasting appearance relative to the picture of the plant on said other face.

6. A designing device for the purposes described and comprising a series of cut-outs, each cut-out having scaled pictures of an individual plant in true color on opposite faces, respectively, the pictures on opposite faces of the same cut-out being pictures of the same plant at different seasons, the series containing pictures of different plants, each cut-out conforming in outline substantially to one of the associated pictures on one face thereof, all of said pictures being on the same scale, a base plot having a plurality of slots located scaled distances apart to the same scale as the pictures, each cut-out having a base receivable in said slots for supporting the cut-outs on the base, the length of each base being substantially equal to the corresponding dimension, on said scale, of a preferred planting area of the pictured plant, and each base extending substantially equi-distantly in opposite directions from the vertical median line of the associated pictured plant.

7. A designing device for the purposes described and comprising a series of cut-outs, each cut-out having scaled pictures of an individual plant in true color on opposite faces, respectively, the pictures on opposite faces of the same cut-out being pictures of the same plant at different seasons, and a series containing pictures of different plants, each cut-out conforming in outline substantially to one of the associated pictures on one face thereof, all of said pictures being on the same scale, each cut-out having a base for supporting it in upright position on a base plot, the bases being cooperable to engage each other and prevent placement of the cut-outs in a row closer than the preferred distance, on said scale, at which the associated pictured plants should be placed from corresponding actual plants in actual planting.

8. A designing device for the purposes described and comprising a plurality of relatively thin individual pictures of individual plants, all of said pictures being on the same scale, bases on the pictures respectively, said bases being abuttable with each other when the cut-outs are arranged in a row with the pictured plants upright and the bases of the associated pictured plants being related to each other on said scale to position the pictures the scaled required minimum planting distances from each other of the plants pictured thereby when the pictures are arranged in a row with their bases abutting.

9. A designing device for the purposes described and comprising a plurality of relatively thin individual pictures of individual plants, all of said pictures being on the same scale, a base on each picture and extending generally horizontally relative to the upright pictured plant and said base, at least in the plane of the associated picture, extending substantially equidistantly in opposite directions from the upright median line of the pictured plant, the horizontal extent of the base in said plane being substantially equal on said scale to the corresponding dimension of the planting area which is preferred for the plant represented by the picture.

10. A designing device for the purposes described and comprising a plurality of scaled pictures of plants, each picture being of an individual plant and the series containing pictures of different plants, all of said pictures being on the same scale, bases on the pictures respectively and extending generally horizontally with respect to the vertical median line of the associated pictured plant and being of an area in said horizontal plane to represent, on said scale, the preferred planting area to be allowed for the plant represented by the associated picture.

ROBERTA H. BOLE.